(12) United States Patent
Kashima et al.

(10) Patent No.: US 12,534,395 B2
(45) Date of Patent: Jan. 27, 2026

(54) GLASS SUBSTRATE UNIT, COVER GLASS ASSEMBLY, AND VEHICLE-MOUNTED DISPLAY DEVICE

(71) Applicant: AGC Inc., Tokyo (JP)

(72) Inventors: Izuru Kashima, Tokyo (JP); Yusuke Fujiwara, Tokyo (JP); Hitoshi Mishiro, Tokyo (JP)

(73) Assignee: AGC Inc., Tokyo (JP)

( * ) Notice: Subject to any disclaimer, the term of this patent is extended or adjusted under 35 U.S.C. 154(b) by 559 days.

(21) Appl. No.: 17/652,968

(22) Filed: Mar. 1, 2022

(65) Prior Publication Data

US 2022/0185112 A1 Jun. 16, 2022

Related U.S. Application Data

(63) Continuation of application No. PCT/JP2020/031661, filed on Aug. 21, 2020.

(30) Foreign Application Priority Data

Sep. 3, 2019 (JP) .................................. 2019-160236

(51) Int. Cl.
*C03C 3/083* (2006.01)
*B60K 35/22* (2024.01)
(Continued)

(52) U.S. Cl.
CPC .............. *C03C 3/083* (2013.01); *B60K 35/22* (2024.01); *B60K 35/28* (2024.01); *B60K 35/60* (2024.01);
(Continued)

(58) Field of Classification Search
CPC .. B60K 35/00; B60K 35/223; B60K 2360/20; B60K 2360/693; C03C 3/083
See application file for complete search history.

(56) References Cited

U.S. PATENT DOCUMENTS 10,775,657 B2 9/2020 Inoue et al.
2016/0224822 A1 8/2016 Hasegawa et al.
(Continued)

FOREIGN PATENT DOCUMENTS

CN 106250800 A 12/2016
JP 2001-142194 A 5/2001
(Continued)

OTHER PUBLICATIONS

Espacenet translation of JP-2017049274-A (Year: 2024).*
(Continued)

*Primary Examiner* — Michael Zhang
(74) *Attorney, Agent, or Firm* — Oblon, McClelland, Maier & Neustadt, L.L.P.

(57) ABSTRACT

A glass substrate unit includes a glass substrate and a glass deformation device for deforming the glass substrate. The glass substrate includes a thin portion and a thick portion, the thin portion having a first main surface and a second main surface opposite to the first main surface, the thick portion having a first main surface and a second main surface opposite to the first main surface and having a sheet thickness larger than a sheet thickness of the thin portion. The glass deformation device deforms the glass substrate by moving one of the thin portion and the thick portion.

40 Claims, 6 Drawing Sheets

(51) Int. Cl.
  *B60K 35/28* (2024.01)
  *B60K 35/60* (2024.01)
  *B60K 35/80* (2024.01)
(52) U.S. Cl.
  CPC ............ *B60K 35/80* (2024.01); *B60K 35/223* (2024.01); *B60K 2360/20* (2024.01); *B60K 2360/652* (2024.01)

(56) References Cited

U.S. PATENT DOCUMENTS

| | | |
|---|---|---|
| 2016/0357294 A1 | 12/2016 | Ozeki et al. |
| 2017/0192572 A1 | 7/2017 | Han et al. |
| 2018/0074397 A1 | 3/2018 | Koike et al. |
| 2019/0101787 A1 | 4/2019 | Inoue et al. |
| 2019/0248098 A1 | 8/2019 | Ozeki et al. |
| 2022/0127191 A1* | 4/2022 | Kashima .................. C03C 27/06 |
| 2022/0291712 A1* | 9/2022 | Baby ...................... G06F 1/1637 |

FOREIGN PATENT DOCUMENTS

| | | | | |
|---|---|---|---|---|
| JP | 2017048090 | A | * | 3/2017 |
| JP | 2017049274 | A | * | 3/2017 |
| JP | 2017-120415 | A | | 7/2017 |
| JP | 6198194 | B2 | | 9/2017 |
| JP | 2019-006650 | A | | 1/2019 |
| JP | 2019-026519 | A | | 2/2019 |
| JP | 2019-064874 | A | | 4/2019 |
| KR | 20170122554 | A | * | 11/2017 |
| WO | WO 2015/178391 | A1 | | 11/2015 |
| WO | WO 2016/194785 | A1 | | 12/2016 |
| WO | WO 2018/116981 | A1 | | 6/2018 |
| WO | WO 2018/129065 | A2 | | 7/2018 |
| WO | WO 2021/006043 | A1 | | 1/2021 |

OTHER PUBLICATIONS

Espacenet translation of JP-2017048090-A (Year: 2024).*
ip.com translation of KR20170122554A (Year: 2025).*
Extended European Search Report issued Sep. 21, 2023, in European Patent Application No. 20859734.4, 7 pages.
International Search Report issued Nov. 10, 2020 in PCT/JP2020/031661 filed on Aug. 21, 2020, 3 pages.

* cited by examiner

GLASS SUBSTRATE UNIT, COVER GLASS ASSEMBLY, AND VEHICLE-MOUNTED DISPLAY DEVICE

TECHNICAL FIELD

The present invention relates to a glass substrate unit, a cover glass assembly, and an in-vehicle display device.

BACKGROUND ART

It is already known to protect a surface of a display device, including a display for mounting in a vehicle, by a glass substrate (see, for example, Patent Literature 1).

On the other hand, it is also known that a display is movable (deformable) and its surface is covered by a glass substrate. For example, Patent Literatures 2 to 4 disclose a configuration where a sheet-shaped glass substrate is attached, out of a surface of a foldable display, to a movable section (bending portion) and a non-movable section. In such a configuration, the glass substrate can be caused to move (deform) together with the display.

CITATION LIST

Patent Literature

Patent Literature 1: International Publication WO2018/129065
Patent Literature 2: JP-A-2017-120415
Patent Literature 3: Japanese Patent No. 6198194
Patent Literature 4: International Publication WO2015/178391

SUMMARY OF INVENTION

Technical Problem

With respect to a glass substrate protecting a display, etc., it may be assumed that in the case of allowing the glass substrate to move together with the display, a portion having higher impact resistance than other portions needs to be provided in the glass substrate. Above all, in the case of protecting a display for mounting in a vehicle by a glass substrate as in Patent Literature 1, for example, out of the glass substrate, a portion opposite an occupant (specifically, an occupant on the passenger seat side) is required to have higher impact resistance (head impact resistance).

As regards this, in Patent Literatures 2 to 4, the thickness of the glass substrate protecting a display is uniform, and it is difficult to satisfy the requirement above. In particular, as far as the protective glass of a display for mounting in a vehicle is concerned, sufficient impact resistance is not ensured in a portion requiring impact resistance (head impact resistance).

An object of the present invention is to provide a glass substrate unit where in a structure having a glass substrate that is movable, the impact resistance in a predetermined portion of the glass substrate is ensured, a cover glass assembly, and an in-vehicle display device.

Solution to Problem

As a result of intensive studies, the present inventors have found that the above-described object can be attained by employing the following configurations.

That is, the present invention relates to [1] to [16] below.

[1] A glass substrate unit including a glass substrate and a glass deformation device for deforming the glass substrate, wherein the glass substrate includes a thin portion and a thick portion, the thin portion having a first main surface and a second main surface opposite to the first main surface, the thick portion having a first main surface and a second main surface opposite to the first main surface and having a sheet thickness larger than a sheet thickness of the thin portion, and wherein the glass deformation device deforms the glass substrate by moving one of the thin portion and the thick portion.

[2] The glass substrate unit according to [1] above, wherein a shape of the glass substrate is switchable between a first shape where the thin portion extends in a plate shape and a second shape where the thin portion is elastically deformed.

[3] The glass substrate unit according to [2], wherein in the second shape, the thin portion is elastically deformed into a concave shape.

[4] The glass substrate unit according to any one of [1] to [3] above, wherein a display panel is mounted on the first main surface of the thin portion, and the glass deformation device moves the thin portion together with the display panel.

[5] The glass substrate unit according to any one of [1] to [4] above, wherein the glass substrate further includes a connection portion having a first connection surface and a second connection surface, the first connection surface connecting the first main surface of the thin portion and the first main surface of the thick portion, the second connection surface connecting the second main surface of the thin portion and the second main surface of the thick portion, wherein a starting point of deformation of the glass substrate is located in the connection portion or on a thin portion side relative to the connection portion, wherein the first connection surface is an arc-shaped curved surface, and wherein the first connection surface has a curvature radius of 400 μm or more.

[6] The glass substrate unit according to any one of [1] to [4] above, wherein the glass substrate further includes a connection portion having a first connection surface and a second connection surface, the first connection surface connecting the first main surface of the thin portion and the first main surface of the thick portion, the second connection surface connecting the second main surface of the thin portion and the second main surface of the thick portion, wherein a starting point of deformation of the glass substrate is located in the connection portion or on a thin portion side relative to the connection portion, and a sheet thickness of the thinnest part in the connection portion is smaller than the sheet thickness of the thin portion.

[7] The glass substrate unit according to [6] above, wherein the sheet thickness of the thinnest part in the connection portion is 0.5 mm or less.

[8] The glass substrate unit according to any one of [5] to [7] above, wherein the connection portion has an overhang part.

[9] The glass substrate unit according to any one of [1] to [4] above, wherein the glass substrate further includes a connection portion having a first connection surface and a second connection surface, the first connection surface connecting the first main surface of the thin portion and the first main surface of the thick portion, the second connection surface connecting the second main surface of the thin portion and the second main surface of the thick portion, wherein a starting point of deformation of the glass substrate is located in the connection portion or on a thin portion side relative to the connection portion, wherein the first connection surface has a first adjoining surface adjacent to the first main surface of the thin potion and a second adjoining surface adjacent to the first main surface of the thick portion, and wherein the first adjoining surface and the second adjoining surface both are an arc-shaped curved surface and are connected to each other to constitute the first connection surface that is bent into an S shape.

[10] The glass substrate unit according to any one of [1] to [9] above, wherein the sheet thickness of the thin portion is 0.05 mm or more and 0.8 mm or less and the sheet thickness of the thick portion is 0.5 mm or more and 2.5 mm or less.

[11] The glass substrate unit according to any one of [1] to [10] above, wherein the glass substrate is a chemically strengthened glass.

[12] The glass substrate unit according to any one of [1] to [11] above, wherein the glass deformation device is constituted by an actuator that applies an external force to one of the thin portion and thick portion in the glass substrate.

[13] The glass substrate unit according to [12] above, further including a controller for controlling an operating state of the actuator.

[14] A cover glass assembly including the glass substrate unit according to any one of [1] to [13] above, wherein the glass substrate functions as a cover glass for a display panel.

[15] An in-vehicle display device including an instrument cluster provided in front of a driving seat, a center information display provided in front of an area between the driving seat and a passenger seat, and the glass substrate unit according to any one of [1] to [13], wherein the instrument cluster is mounted on the first main surface of the thin portion, wherein the center information display is mounted on the first main surface of the thick portion, and wherein while a vehicle equipped with the in-vehicle display device is driving, the glass deformation device elastically deforms the thin portion into a concave shape and moves the thin portion together with the instrument cluster, thereby allowing the glass substrate to deform.

[16] An in-vehicle display device including an instrument cluster provided in front of a driving seat, a center information display provided in front of an area between the driving seat and a passenger seat, and the glass substrate unit according to any one of [1] to [13], wherein the instrument cluster is mounted on the first main surface of the thin portion, wherein the center information display is mounted on the first main surface of the thick portion, and wherein while a vehicle equipped with the in-vehicle display device is driving, the glass deformation device moves the thick portion close to the driving seat together with the center information display, thereby allowing the glass substrate to deform.

Advantageous Effects of Invention

According to the present invention, in a structure having a glass substrate that is deformable, out of the glass substrate, a portion requiring higher impact resistance is assigned to a thick portion and impact resistance in that portion can thereby be sufficiently ensured.

DESCRIPTION OF EMBODIMENTS

Specific embodiments of the present invention are described below by referring to the drawings. However, the present invention is not limited to the following embodiments. Various modifications and substitutions can be made to the following embodiments without departing from the scope of the present invention.

The range expressed using "to" includes both ends of the range. For example, the range expressed as "A to B" includes A and B.

The sheet thickness (average sheet thickness) of glass is determined by the measurement using a micrometer.

The way of determining the curvature radius of a curved surface of glass is described in a later paragraph by referring to FIG. 11.

The compressive stress value (Compressive Stress; hereinafter referred to as CS) of the compressive stress layer of glass and the depth of the compressive stress layer (Depth of Layer; hereinafter referred to as DOL) are determined by the measurement using a surface stress meter (FSM-6000) manufactured by Orihara Industrial Co., Ltd. The internal tensile stress (Central Tension; hereinafter referred to as CT) of glass is determined from CS, DOL and sheet thickness t according to the following formula:

$$CT = CS\,[\text{MPa}] \times DOL\,[\text{mm}] / (t\,[\text{mm}] - 2 \times DOL\,[\text{mm}])$$

The limit bend radius of glass is a minimum bend radius at which cracks are not generated when bending the glass, and the bend radius is determined by the following bending test. The bending test and the bending test apparatus used for the bending test are in conformity with the test and apparatus described in International Publication WO2016/194785. The procedure of the bending test is as follows.

(Bending Test)

A first support board and a second support board are disposed in parallel by arranging the support surface of the first support board and the support surface of the second support board to face each other. Edges of the glass are supported by the first support board and the second support board, respectively. The distance between the support surface of the first support board and the support surface of the second support board is set to a state of maintaining a distance D [mm] determined according to the following formula (1). In this state, the position of the second support board relative to the first support board is moved back-and-forth by 100 mm in parallel to the support surface of the first support board and the support surface of the second support board and in a direction not involving a change in the curvature direction of the glass. Whether or not a crack is formed in the glass curved between the first support board and the second support board is examined. The bend radius R is determined according to the following formula (2).

$$D=(A \times E \times t/\sigma)+t \quad (1)$$

$$R=D/2 \quad (2)$$

D: Distance [mm] between the support surface of the first support board and the support surface of the second support board

A=1.198

E: Young's modulus of the glass [MPa]

t: Sheet thickness [mm] of the glass

σ: Bending stress [MPa]

The surface strength of a glass sheet is determined by a ball-on-ring (BOR) test described below.

(Ball-On-Ring Test)

First, a glass sheet is horizontally disposed on a stainless steel-made ring. As for the ring, the diameter is 30 mm, and the curvature radius of the contact portion with the glass sheet is 2.5 mm.

Next, at the center position of the ring, a sphere composed of steel having a diameter of 10 mm is brought into contact with the glass sheet disposed on the ring.

In this state, the sphere is caused to descend and press against the glass sheet (descent rate of sphere: 1.0 mm/min), and a static load is thereby applied to the glass sheet to fracture the glass sheet.

The load at which the glass sheet is fractured is measured, and an average value of 20 measurements is used as the surface strength of the glass sheet. In the case where the fracture origin of the glass sheet is 2 mm or more apart from the sphere-pressing position, the value is excluded from the measured values for calculating the average value.

First Embodiment

A first embodiment is described by referring to FIG. 1 to FIG. 4.

Figure 1:
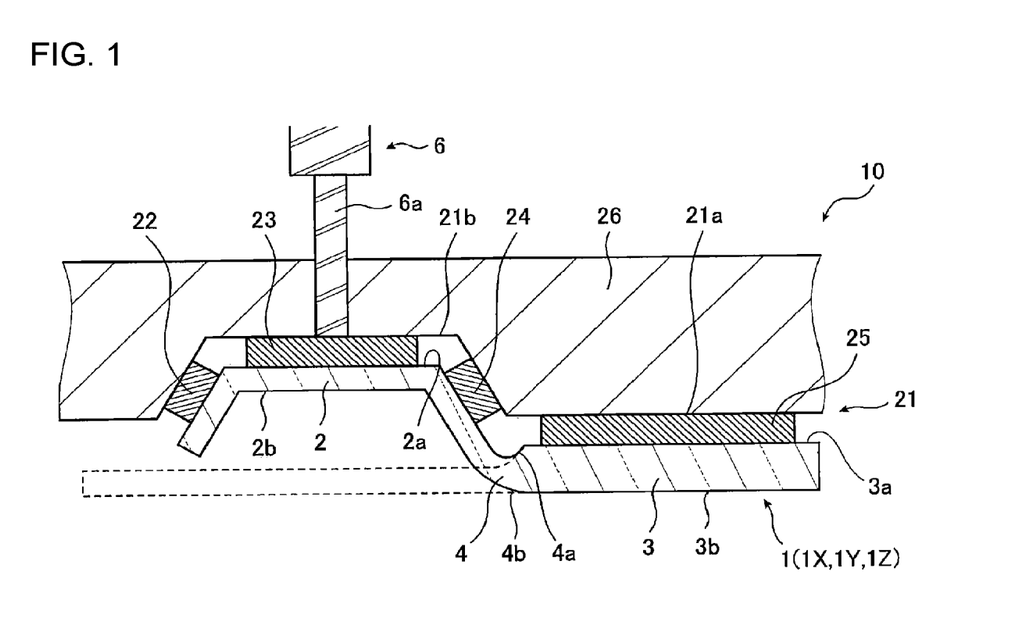
FIG. 1 is a schematic cross-sectional diagram of a glass substrate unit according to a first embodiment.

FIG. 1 is a schematic cross-sectional diagram of a glass substrate unit according to a first embodiment (hereinafter, a glass substrate unit 10).

Figure 2:
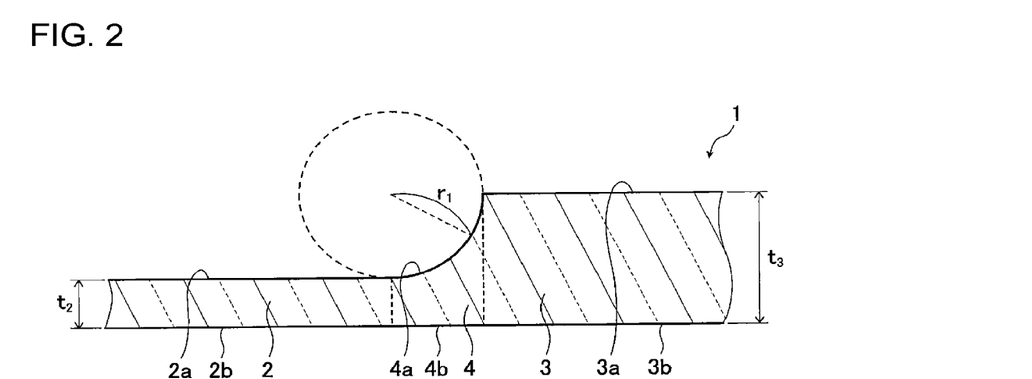
FIG. 2 is a schematic cross-sectional diagram of a glass substrate according to a first embodiment.

FIG. 2 is a schematic cross-sectional diagram of a glass substrate according to a first embodiment (hereinafter, a glass substrate 1).

Figure 3:
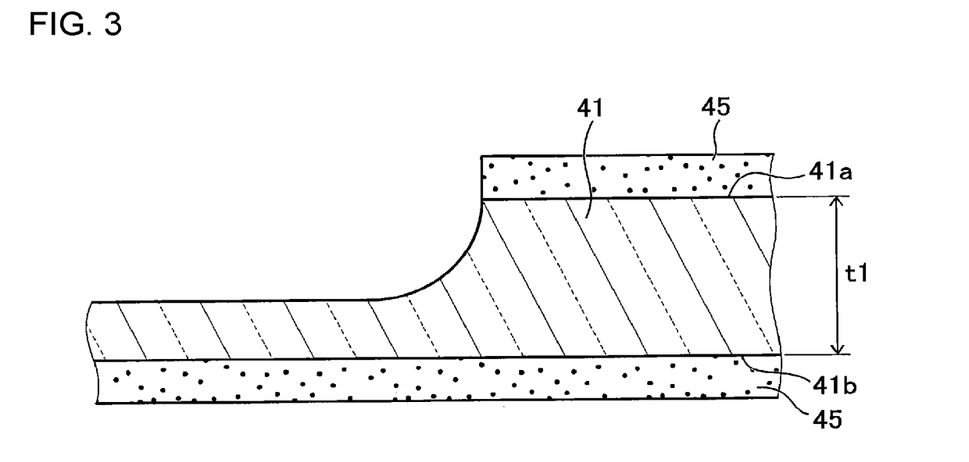
FIG. 3 is a schematic cross-sectional diagram illustrating a glass sheet after etching.

FIG. 3 is a diagram illustrating a manufacturing process of the glass substrate 1 and, specifically, a schematic cross-sectional diagram illustrating a glass sheet 41 after etching.

Figure 4:
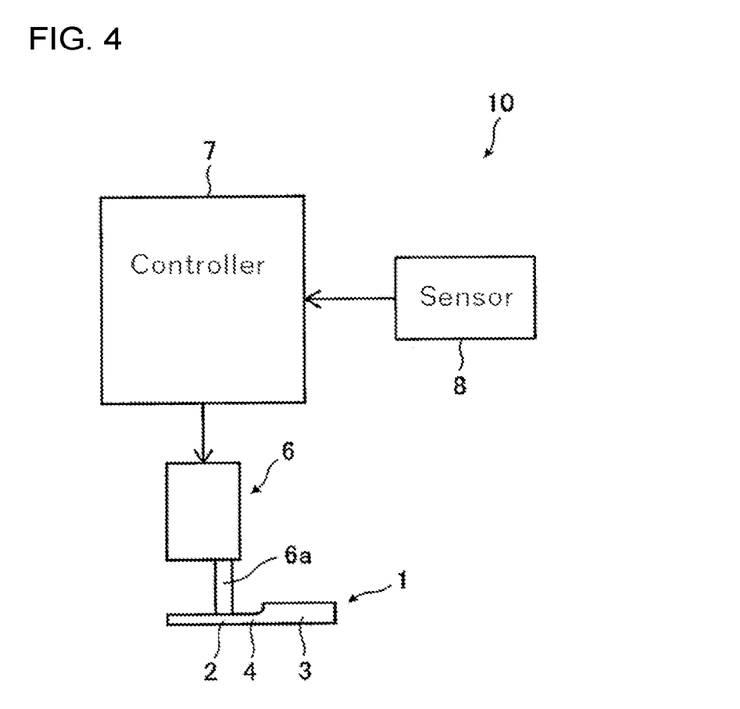
FIG. 4 is a block diagram illustrating a control system of a glass substrate unit according to a first embodiment.

FIG. 4 is a block diagram illustrating a control system of the glass substrate unit 10.

As illustrated in FIG. 1, the glass substrate unit 10 has a glass substrate 1 and a glass deformation device 6 for deforming the glass substrate 1.

Also, as illustrated in FIG. 4, the glass substrate unit 10 further has a controller 7 for controlling the glass deformation device 6.

The glass substrate 1, the glass deformation device 6, and the controller 7 are each individually described below.

In the following, for convenience of description, the sheet thickness direction of the glass substrate 1 is referred to as "sheet thickness direction". In addition, the direction in which the later-described thin portion 2, connection portion 4 and thick portion 3 are aligned in the glass substrate 1 is referred to as "aligning direction".

<Glass Substrate>

As illustrated in FIG. 1, the glass substrate 1 has a thin portion 2, a thick portion 3, and a connection portion 4.

The thin portion 2 has a first main surface 2a and a second main surface 2b opposite to the first main surface 2a.

The thick portion 3 has a first main surface 3a and a second main surface 3b opposite to the first main surface 3a.

The sheet thickness $t_3$ of the thick portion 3 is larger than the sheet thickness $t_2$ of the thin portion 2.

The connection portion 4 is arranged between the thin portion 2 and the thick portion 3 and has a first connection surface 4a and a second connection surface 4b. The first connection surface 4a connects the first main surface 2a of the thin portion 2 and the first main surface 3a of the thick portion 3. The second connection surface 4b connects the second main surface 2b of the thin portion 2 and the second main surface 3b of the thick portion 3.

In the first embodiment, the sheet thickness of the connection portion 4 is gradually increased toward the thick portion 3 side from the thin portion 2 side. However, without being limited to this, the sheet thickness of the connection portion 4 may stepwise be increased toward the thick portion 3 side from the thin portion 2 side.

Alternatively, without providing the connection portion 4, the sheet thickness of the glass substrate 1 maybe discontinuously changed from the sheet thickness $t_2$ to the sheet thickness $t_3$ at the boundary position between the thin portion 2 and the thick portion 3.

The thin portion 2 and the connection portion 4 have flexibility and are elastically deformable. That is, the glass substrate 1 can change its shape.

Specifically, the shape of the glass substrate 1 is switchable between a first shape where the thin portion 2 extends in a plate shape (in FIG. 1, the shape depicted by the dashed line) and a second shape where the thin portion 2 is elastically deformed into a concave shape protruding toward the back side in the sheet thickness direction (in FIG. 1, the shape depicted by the solid line). Elastic deformation into a concave shape of the thin portion 2 enhances the visibility of a device mounted on the thin portion 2 (for example, the later-described display panels 22, 23 and 24). However, without being limited to this, the thin portion 2 may be elastically deformed in a convex shape protruding toward the front side in the sheet thickness direction, or the thin portion 2 may be elastically deformed into an S shape by using a plurality of the later-described actuators.

Also, in the configuration illustrated in FIG. 1, the starting point where the glass substrate 1 deforms (bend starting point) is in the connection portion 4. In this case, the thin portion 2 is not caught on a device protected by the thick portion 3 (for example, the later-described center information display), and the head impact resistance of the device is sufficiently satisfied. However, the bend starting point is not limited to the connection portion 4 and may be located on the thin portion 2 side relative to the connection portion 4.

Furthermore, as illustrated in FIG. 1, a display panel is mounted on each of the first main surface 2a of the thin portion 2 and the first main surface 3a of the thick portion 3.

In detail, three display panels 22, 23 and 24 are attached to the first main surface 2a of the thin portion 2 in the state of being separated from each other in the aligning direction.

Here, a film-like optical self-adhesive sheet (Optical Clear Adhesive; hereinafter, referred to as OCA) (not shown) intervenes between the first main surface 2a of the thin portion 2 and the three display panels 22, 23 and 24.

Also, one display panel 25 is attached to the first main surface 3a of the thick portion 3 via OCA (not shown).

Here, respective display panels 22 to 25 are, for example, a liquid crystal panel. A backlight unit (not shown) is disposed on a back surface side of each liquid crystal panel. Respective display panels 22 to 25 may be, for example, an organic EL panel, a plasma display penal, an electronic ink-type panel, etc. Alternatively, respective display panels 22 to 25 may have a touch panel, etc.

As a modification example, a configuration of, in a display device where respective display panels 22 to 25 have a liquid crystal panel, attaching a casing portion of the display device and the glass substrate 1 to each other may also be considered.

The glass substrate 1 on which display panels 22 to 25 are mounted functions as a cover glass for respective display panels 22 to 25. That is, in the first embodiment, the glass substrate 1 is used as a cover glass and covers respective display panels 22 to 25.

In the case of being used as a cover glass, the glass substrate 1 is preferably a glass subjected to a chemical strengthening treatment (chemically strengthened glass).

The glass substrate 1 on which display panels 22 to 25 are mounted is assembled to a flame 26 having an uneven structure 21.

Out of the flame 26, a portion serving as a convex portion 21a of the uneven structure 21 has a flat portion. The thick portion 3 is fixed to the convex portion 21a of the flame 26 in the state of the display panel 25 being inserted between the flat portion and the thick portion 3 of the glass substrate 1.

Out of the flame 26, a portion serving as a concave portion 21b of the uneven structure 21 has an isosceles trapezoid-shaped recess portion. The thin portion 2 is disposed in the state of being freely deformable relative to the concave portion 21b while the display panels 22, 23 and 24 are located between the recess portion and the thin portion 2 of the glass substrate 1.

The display panels 22, 23 and 24 are not fixed to the flame 26 and when the thin portion 2 deforms, respective disposition positions of the display panels 22, 23 and 24 are changed in association therewith.

The glass substrate 1 is deformable in the state of the thin portion 2 and the thick portion 3 being fixed to the flame 26 and can be changed between the first shape and the second shape.

More specifically, when the shape of the glass substrate 1 is the first shape, the thin portion 2 extends in a plate shape along the aligning direction at the front of the concave portion 21b of the flame 26.

On the other hand, when the shape of the glass substrate 1 is the second shape, the thin portion 2 is elastically deformed along the concave portion 21b of the flame 26. More specifically, the glass substrate 1 is bent forward or backward with the connection portion 4 as the starting point such that the thin portion 2 penetrates into the concave portion 21b, and furthermore, the thin portion 2 is bent at a position between the display panels 22 and 23 and at a position between the display panels 23 and 24.

When the shape of the glass substrate 1 is the second shape, the display panels 22, 23 and 24 are sandwiched between the inner wall surface of the concave portion 21b and the thin portion 2.

More specifically, provided that the direction when the flame 26 is viewed from the glass substrate 1 is the back side and the direction when the glass substrate 1 is viewed from the flame 26 is the front side, the display panels 22, 23 and 24 are allowed to be located on a further front side by letting the shape of the glass substrate 1 be the first shape.

On the contrary, the display panels 22, 23 and 24 are allowed to be located on the further back side by letting the shape of the glass substrate 1 be the second shape.

Here, in the case of switching the shape of the glass substrate 1 from the first shape to the second shape, the glass substrate 1 needs to be bent at the bend starting point (specifically, in the connection portion 4 or on the thin portion 2 side relative to the connection portion 4).

At this time, if the glass substrate 1 is hard to bend at the bend starting point (the bending is insufficient), there may be caused a trouble, for example, the display panel 24 is likely to be separated from the first main surface 2a of the thin portion 2.

In this connection, in the first embodiment, as illustrated in FIG. 2, the first connection surface 4a of the connection portion 4 is an arc-shaped curved surface, and the curvature radius $r_1$ of the first connection surface 4a is 400 μm or more.

This facilitates bending of the connection portion 4 and makes it difficult for the display panel 24 to be separated from the first main surface 2a of the thin portion 2.

In addition, since the first connection surface 4a is an arc-shaped curved surface, when a film material such as OCA is closely adhered to the first connection surface 4a, even if bubbles enter between the first connection surface 4a and the film material, an effect of facilitating escape of the bubbles can also be expected.

For the reason that the above-described effect is more effectively exerted, the curvature radius $r_1$ of the first connection surface 4a is preferably 550 μm or more, more preferably 700 μm or more.

Also, with respect to the curvature radius $r_1$ of the first connection surface 4a, the upper limit is not particularly limited but is preferably 1,300 μm or less, more preferably 1,100 μm or less, still more preferably 900 μm or less.

Figure 11:
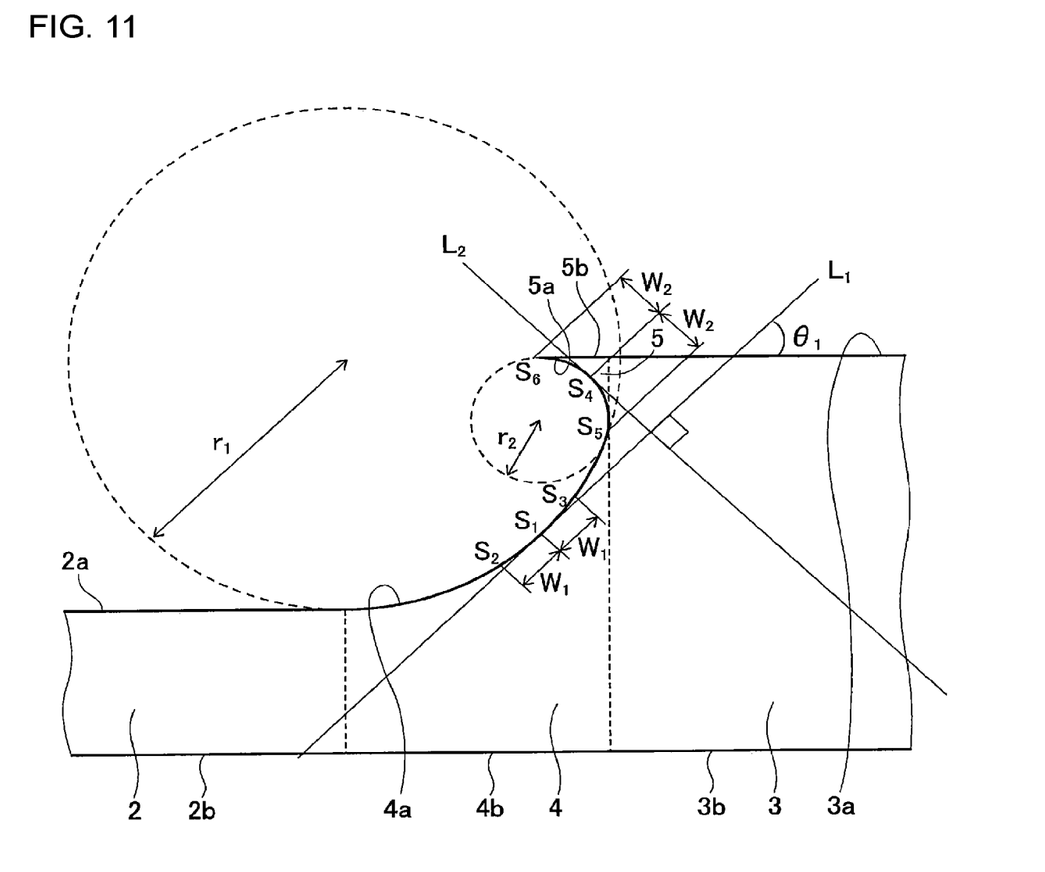
FIG. 11 is a schematic cross-sectional diagram for explaining the way of determining the curvature radius of the first connection surface and the curvature radius of the overhang surface.

Here, the way of determining the curvature radius $r_1$ of the first connection surface 4a is described by referring to FIG. 11. FIG. 11 is a schematic cross-sectional diagram for explaining the way of determining the curvature radius $r_1$ of the first connection surface 4a and the curvature radius $r_2$ of the later-described overhang surface 5a.

Note that FIG. 11 is an enlarged diagram of FIG. 6 that is referred to in the later paragraph.

The curvature radius $r_1$ of the first connection surface 4a of the connection portion 4 is determined as follows.

First, consider a straight light $L_1$ that is inclined in a direction extending from the first main surface 3a of the thick portion 3 to the second connection surface 4b of the connection portion 4 and intersects with the first main surface 3a of the thick portion 3 at an angle $\theta_1$ (=45°).

The straight line $L_1$ is moved in a direction toward the connection portion 4 from the thick portion 3 and when the straight line $L_1$ first contacts at one point with the first connection surface 4a, the contact point is designated as point $S_1$.

Next, a point spaced from the point $S_1$ by a length $W_1$ (=10 μm) along the straight line $L_1$ and located on the first connection surface 4a is designated as point $S_2$. Likewise, a point spaced opposite to the point $S_2$ from the point $S_1$ along the straight line $L_1$ by a length $W_1$ (=10 μm) and located on the first connection surface 4a is designated as point $S_3$.

The radius of a true circle passing through point $S_1$, point $S_2$ and point $S_3$ is used as the curvature radius $r_1$ of the first connection surface 4a of the connection portion 4.

With respect to the dimension, feature, etc. of each portion of the glass substrate 1, appropriate values are described in detail.

The sheet thickness $t_2$ of the thin portion 2 is preferably 0.05 mm or more, more preferably 0.2 mm or more. On the other hand, the sheet thickness $t_2$ of the thin portion 2 is preferably 0.8 mm or less, more preferably 0.6 mm or less.

The compressive stress value (CS) of the compressive stress layer of the thin portion 2 is preferably 500 MPa or more, more preferably 650 MPa or more, still more preferably 750 MPa or more.

The depth of the compressive stress layer (DOL) of the thin portion 2 is preferably 10 μm or more, more preferably 15 μm or more, still more preferably 25 μm or more.

The internal tensile stress (CT) of the thin portion 2 is preferably 160 MPa or less, more preferably 140 MPa or less. On the other hand, CT of the thin portion 2 is preferably 20 MPa or more, more preferably 30 MPa or more.

The limit bend radius of the thin portion 2 is preferably 60 mm or less, more preferably 50 mm or less, still more preferably 40 mm or less.

The sheet thickness $t_3$ of the thick portion 3 is preferably 0.5 mm or more, more preferably 0.7 mm or more. On the other hand, the sheet thickness $t_3$ of the thick portion 3 is preferably 2.5 mm or less, more preferably 2.0 mm or less. When the sheet thickness $t_3$ of the thick portion 3 is in this range, the thick portion 3 enjoys excellent impact resistance.

For the reason that the thick portion 3 has excellent impact resistance, the compressive stress value (CS) of the compressive stress layer of the thick portion 3 is preferably 500 MPa or more, more preferably 650 MPa or more, still more preferably 750 MPa or more.

For the reason that the thick portion 3 has excellent impact resistance, the depth of the compressive stress layer (DOL) of the thick portion 3 is preferably 10 μm or more, more preferably 15 μm or more, still more preferably 25 μm or more.

For the reason that the thick portion 3 has excellent impact resistance, the internal tensile stress (CT) of the thick portion 3 is preferably 50 MPa or less, more preferably 30 MPa or less. On the other hand, CT of the thick portion 3 is preferably 1 MPa or more, more preferably 5 MPa or more.

For the reason that the thick portion 3 has excellent impact resistance, the surface strength of the thick portion 3 is preferably 150 kgf or more, more preferably 200 kgf or more, still more preferably 250 kgf or more.

The number density (unit: pieces/(5 cm×5 cm)) of broken pieces having an area of 25 mm² or more (hereinafter, sometimes simply referred to as "broken pieces") of the thin portion 2 and that of the thick portion 3 are preferably different from each other, and it is more preferred that there is a clear difference therebetween.

Specifically, the difference in the number density of broken pieces between the thin portion 2 and the thick portion 3 is preferably 0.1 pieces/(5 cm×5 cm) or more, more preferably 1 piece/(5 cm×5 cm) or more, still more preferably 5 pieces/(5 cm×5 cm) or more, yet still more preferably 7 pieces/(5 cm×5 cm) or more.

When the difference in the number density of broken pieces is in this range, a break in the thin portion 2 and a break in the thick portion 3 become discontinuous and even if the thin portion 2 is broken, spread of the break to the thick portion 3 can be reduced.

Also, the number of broken pieces may be larger in the thin portion 2 than in the thick portion 3. In this case, there is a technical meaning that when an impact acts on the thin portion 2 and the thin portion 2 is broken, propagation of a crack from the thin portion 2 to the thick portion 3 is reduced.

That is, the number of broken pieces is preferably larger in the thin portion 2 than in the thick portion 3, because propagation of a crack from the thin portion 2 to the thick portion 3 is suppressed in the connection portion 4. Specifically, per 30 cm length of the connection portion 4, propagation of one or more cracks is preferably suppressed, and it is more preferred that propagation of three or more cracks is suppressed.

The number density of broken pieces is determined as follows.

First, each of the thin portion 2 and the thick portion 3 is subjected to a head impact test.

More specifically, according to the same procedure as the procedure described in paragraphs [0081] to [0088] of JP-A-2019-64874, a test specimen using the thin portion 2 or thick portion 3 as a cover glass is prepared, and a rigid model is caused to collide against it.

Here, the collision position of the rigid model is the center position of the main surface of the cover glass, and the rigid model is caused to collide from a direction perpendicular to the main surface.

In the case where the cover glass is not broken by the collision with the rigid model, the height of the rigid model is raised by 5 cm, and the rigid model is again caused to collide against the cover glass. This operation is repeated until the cover glass is broken.

When the cover glass is broken, the number and area of broken pieces in a region 10 cm or more apart from the collision position of the rigid model are measured, and from these, the number density of broken pieces is determined.

The size and number density of broken pieces can be adjusted by adjusting the conditions of the later-described chemical strengthening treatment. For example, at the time of cooling the glass sheet after immersion in a molten salt, cooling is accelerated only in a portion serving as the thin portion 2 or only in a portion serving as the thick portion 3. This technique enables precise control of the size and number density of broken pieces.

For the reason that the breaking strength of the thick portion 3 is maintained, the ratio of CT of the thin portion 2 to CT of the thick portion 3 (CT of thin portion 2/CT of thick portion 3) is preferably 1.1 or more, more preferably 1.5 or more, still more preferably 3.0 or more.

On the other hand, for the reason that the breaking strength of the thin portion 2 is maintained, the ratio above is preferably 20 or less, more preferably 10 or less, still more preferably 7 or less.

As described above, the first connection surface 4a of the connection portion 4 is an arc-shaped curved surface.

On the other hand, the second connection surface 4b of the connection portion 4 is a projection plane when the first connection surface 4a is projected in a direction parallel to the sheet thickness direction. Accordingly, the sheet thickness of the connection portion 4 is continuously changed in the aligning direction and is thicker closer to the thick portion 3 and thinner closer to the thin portion 2.

Here, propagation of a crack from the thin portion 2 to the thick portion 3 can be increased or decreased by adjusting the sheet thickness of the connection portion 4. Specifically, as the sheet thickness of the connection portion 4 is decreased, propagation of a crack over the connection portion 4 can be more suppressed.

For the reason above, the sheet thickness of the connection portion 4 is preferably 0.5 mm or less, more preferably 0.3 mm or less, still more preferably 0.2 mm or less.

On the other hand, from the viewpoint that the glass substrate 1 is not easily broken during transport or mounting, the sheet thickness of the connection portion 4 is preferably 0.05 mm or more, more preferably 0.07 mm or more, still more preferably 0.1 mm or more.

In the present description, unless otherwise indicated, the sheet thickness of the connection portion 4 is a sheet thickness of the thinnest portion in the connection portion 4.

The method for manufacturing the hereinabove-described glass substrate 1 according to the first embodiment is described by referring to FIG. 3.

First, a glass sheet 41 having a first main surface 41a and a second main surface 41b is prepared.

The sheet thickness $t_1$ of the glass sheet 41 is the same as the sheet thickness $t_3$ of the thick portion 3 of the completed glass substrate 1.

The glass species of the glass sheet 41 includes, for example, soda lime glass, aluminosilicate glass ($SiO_2$-$Al_2O_3$-$Na_2O$-based glass), etc. The glass composition of the glass sheet 41 includes, for example, a glass composition described in paragraph [0019] of JP-A-2019-006650. In the case of applying the later-described chemical strengthening treatment, for example, a glass for chemical strengthening based on aluminosilicate glass (for example, "Dragontrail (registered trademark)") is suitably used.

After that, the prepared glass sheet 41 is subjected to slimming. The slimming includes masking and etching.

In the masking, out of the first main surface 41a of the glass sheet 41, a surface serving as the first main surface 3a of the thick portion 3 and the entire surface of the second main surface 41b of the glass sheet 41 are covered by a mask material 45.

The material of the mask material 45 is not particularly limited as long as it is a material resistant to the later-described etchant, and a conventional known material may be appropriately selected and used.

In addition, a resist pattern may also be formed as the mask material 45 on the first main surface 41a of the glass sheet 41.

In the etching, the glass sheet 41 covered by the mask material 45 is immersed in a known etchant so as to dissolve the portion not covered by the mask material 45.

Here, the etching is not limited to a wet process using an etchant and may be performed, for example, by a dry process using a hydrogen fluoride gas.

Dissolution by etching gradually proceeds from the first main surface 41a not covered by the mask material 45 toward the second main surface 41b, as a result, a portion serving as the thin portion 2 in the glass sheet 41 is formed.

By the etching, a smooth etching surface (curved surface) is formed on the first main surface 41a of the glass sheet 41. This curved surface serves as the first connection surface 4a having a specific curvature radius $r_1$, as a result, a portion serving as the connection portion 4 in the glass sheet 41 is formed.

On the other hand, a portion that is maintained without being dissolved serves as the thick portion 3 in the glass sheet 41.

After the etching, the mask material 45 is appropriately removed by a known method.

The glass sheet 41 after slimming may be subjected to a chemical strengthening treatment.

In the case of applying a chemical strengthening treatment, a glass for chemical strengthening is used as the glass sheet 41.

In the chemical strengthening treatment, a conventionally known method may be employed and, typically, the glass sheet 41 is immersed in a molten salt. A compressive stress layer is consequently formed in the surface layer of the glass sheet 41, and the glass sheet 41 is thereby strengthened.

The treatment conditions such as temperature of and immersion time in molten salt during treatment may be set such that the compressive stress value (CS) of the compressive stress layer, the depth of the compressive stress layer (DOL), etc. show a desired value.

After the immersion in the molten salt, the glass sheet 41 is pulled up from the molten salt and cooled. At this time, the glass sheet 41 may be washed using industrial water, ion-exchanged water, etc.

In the manufacturing method above, the glass substrate 1 is constituted only by the glass sheet 41, but the manufacturing method is not limited thereto. For example, a laminate is prepared by stacking a decorative layer on the first main surface 41a side of the glass sheet 41, and the glass substrate 1 may be constituted by the laminate.

The decorative layer is constituted, for example, by a print layer (ink layer) recorded by an inkjet method. In this case, the sheet thickness of each portion of the glass substrate 1 can be adjusted to each suitable range above by controlling the thickness of the print layer according to the place of each portion of the glass sheet 41.

<Glass Deformation Device>

The glass deformation device 6 is a device that moves one of the thin portion 2 and the thick portion 3 in the glass substrate 1 and thereby deforms the glass substrate 1.

The glass deformation device 6 is constituted, for example, by an actuator that applies an external force to one of the thin portion 2 and thick portion 3 in the glass substrate 1.

Specifically, the actuator constituting the glass deformation device 6 is an electric actuator having a freely extendable/retractable linear rod 6a, a motor (not shown), and a power source (not shown). An end of the rod 6a is connected to the first main surface 2a of the thin portion 2 via the display panel 23.

In the first embodiment, the glass deformation device 6 applies an external force to the thin portion 2 at the time of deformation of the glass substrate 1 and moves the thin portion 2 together with the display panels 22, 23 and 24.

More specifically, when the motor is driven by the power supply from the power source, the rod 6a moves and applies an external force to the thin portion 2 from the first main surface 2a side. At this time, when the rod 6a extends, the thin portion 2 is pushed toward the front side by the rod 6a. Consequently, the thin portion 2 moves together with the display panels 22, 23 and 24 and extends in a plate shape along the aligning direction at the front of the concave portion 21b in the uneven structure 21 of the flame 26. That is, the shape of the glass substrate 1 changes to a first shape.

On the contrary, when the rod 6a retracts, the thin portion 2 is drawn to the back side by the rod 6a. Consequently, the thin portion 2 moves together with the display panels 22, 23 and 24 and elastically deforms into a concave shape along the concave portion 21b. That is, the shape of the glass substrate 1 changes to a second shape.

In the first embodiment, the glass deformation device 6 applies an external force to the thin portion 2 in the glass substrate 1 so as to move the thin portion 2 and the glass substrate 1 is thereby deformed, but the embodiment is not limited thereto. For example, the glass deformation device 6 may apply an external force to the thick portion 3 in the glass substrate 1 so as to move the thick portion 3. In this case, the thick portion 3 itself is not bent, and the glass substrate 1 deforms to bend forward or backward with the connection portion 4 as the starting point.

The actuator constituting the glass deformation device 6 is not limited to an electric actuator using a linear rod, but other types of actuators may also be used.

Other types of actuators include an actuator composed of a cam link mechanism, an actuator composed of a power cylinder that is hydraulically or pneumatically driven, an actuator using a piezoelectric element such as piezo element, and an electromagnetic solenoid actuator, etc.

Furthermore, the glass deformation device 6 is not limited to an actuator and may be sufficient if it is a device capable of applying an external force sufficient to deform the glass substrate 1 to one of the thin portion 2 and the thick portion 3 in the glass substrate 1. For example, after a shape-memory alloy is disposed along the glass substrate 1, the glass substrate 1 may be deformed using a shape change of the shape-memory alloy due to temperature change.

<Controller>

The controller 7 is a device for controlling the operating state of the actuator constituting the glass deformation device 6.

The controller 7 is composed of, for example, a drive control circuit (not shown). The drive control circuit is composed of a memory and a processor for running a program stored in the memory.

As the processor, a general-purpose CPU (Central Processing Unit) can be used.

Besides CPU, a programmable logic device (PLD) that is a processor in which the circuit configuration can be changed after manufacture, such as FPGA (Field Programmable Gate Array), can also be used.

In addition, a dedicated electric circuit that is a processor having a circuit configuration exclusively designed to execute specific processing, such as ASIC (Application Specific Integrated Circuit), can also be used.

Furthermore, the control circuit may be constituted by one of various processors described above or may be constituted by a combination of two or more of the same or different processors, for example, a combination of a plurality of FPGAs or a combination of FPGA and CPU.

Also, a processor realizing the functions of the entire system including a plurality of control circuits by one IC (Integrated Circuit) chip, as typified by a system-on-chip (System on Chip; SoC), etc., may be used as well.

The controller 7 automatically switches the operating state of the actuator when predetermined conditions are satisfied.

In detail, the controller 7 receives a signal output from a predetermined sensor 8 and switches the operating state of the actuator based on the output signal.

The operating state of the actuator is switched between a state at the normal time and a state when predetermined conditions are satisfied, more specifically, is switched between a state where the rod 6a is extending and a state where the rod 6a is retracting.

In association with the switching of the operating state of the actuator, the shape of the glass substrate 1 is switched from the first shape to the second shape or is switched from the second shape to the first shape.

Also, in the first embodiment, the operating state of the actuator is controlled by the controller 7, but a configuration where an operator manually switches the operating state of the actuator may be adopted as well. For example, an operator may operate a handle to transmit a drive force from the handle to the rod 6a and thereby move the rod 6a.

<Use of Glass Substrate Unit>

The above-described glass substrate 1, display panels 22 to 25, flame 26, glass deformation device 6 and controller 7 constitute a glass substrate unit 10.

As described above, the glass substrate 1 functions as cover glasses for the display panels 22 to 25. In other words, the glass substrate unit 10 is a cover glass assembly to which cover glasses are assembled.

The cover glass assembly including the glass substrate unit 10 is used, for example, as a display device, and specific examples thereof include an in-vehicle display device that is used by mounting it on a vehicle.

Specifically, the glass substrate unit 10 is used as an in-vehicle display device having an instrument cluster (cluster) disposed in front of a driving seat and a center information display (CID) disposed in front of an area between the driving seat and a passenger seat.

In this case, out of the glass substrate unit 10 assembled as an in-vehicle display device, the display panels 22, 23 and 24 disposed on the concave portion 21b side in the uneven structure 21 of the flame 26 correspond to the cluster.

Also, the display panel 25 disposed on the convex portion 21a side in the uneven structure 21 of the flame 26 corresponds to CID.

In addition, the thin portion 2 in the glass substrate 1 is used as the cover glass for the cluster, and the thick portion 3 in the glass substrate 1 is used as the cover glass for CID. That is, the cluster is mounted on the first main surface 2a of the thin portion 2, and CID is mounted on the first main surface 3a of the thick portion 3.

The cover glass for CID is absent from a handle operated by a driver and therefore, is likely to be hit directly by the head of an occupant when vehicle crash occurs. Consequently, out of the glass substrate 1, the portion located on the CID side is required to have higher impact resistance (head impact resistance), and the impact resistance in this portion is sufficiently ensured by assigning the portion to the thick portion 3. Here, the thick portion 3 preferably has impact resistance high enough to prevent breaking due to hitting by the head of an occupant upon occurrence of vehicle crash.

On the other hand, the thin portion 2 used as a cover glass for the cluster is disposed on the back side relative to the handle and therefore, has a low possibility of direct hitting by the head of an occupant, and the same level of impact resistance as that of the thin portion 3 is not required.

Also, for the purpose of enhancing the visibility of the cluster, during the driver's operation of the handle to drive a vehicle, the thin portion 2 is preferably elastically deformed into a concave shape along the concave portion 21b in the uneven structure 21 of the flame 26 and thereby moved to the back side together with the display panels 22, 23 and 24.

On the contrary, during the non-operation time of the handle (for example, a period during which a vehicle is stopped for a given length of time), since ease of seeing the cluster is not required, the thin portion 2 need not be elastically deformed into a concave shape, and it is preferred that the thin portion 2 extends in a plate shape.

In addition, for the purpose of preventing the visibility of the cluster, etc. from deteriorating due to reflection of the outside light, the thin portion 2 is preferably moved together with the display panels 22, 23 and 24. For example, after taking a picture of the cabin space by a camera (not shown) mounted in a vehicle and analyzing the image photographed to specify the position of outside light (irradiation position) and the position of the driver, the thin portion 2 and the display panels 22, 23 and 24 may be moved such that the positions above deviate from the positional relationship of specular reflection relative to at least one surface of the cluster.

For these reasons, in an in-vehicle display device to which the glass substrate unit 10 is assemble, during driving of a vehicle equipped with the in-vehicle display device, more specifically, during handle operation and driving, the glass deformation device 6 elastically deforms the thin portion 2 in the glass substrate 1. At this time, the thin portion 2 is elastically deformed into a convex shape, a concave shape, an S shape, etc., but from the viewpoint that ease of seeing the cluster is enhanced, deformation into a concave shape is more preferred. In such a case, the thin portion 2 moves together with the cluster to the back side and in turn, the glass substrate 1 is deformed and switched from the first shape to the second shape.

The controller 7 controls the operating state of an actuator constituting the glass deformation device 6 upon receiving a detection signal output from the sensor 8.

Here, the controller 7 is composed of ECU (Electric Control Unit) serving as an in-vehicle controller. In this case, the controller 7 receives the detection signal above from the sensor 8, for example, via an in-vehicle LAN and controls the glass deformation device 6.

The glass deformation device 6 operates according to the control of the controller 7 and presses the thin portion 2 to the front side to extend it in a plate shape.

The thin portion 2 thereby moves together with the cluster to the front side and, consequently, the glass substrate 1 is deformed and switched from the second shape to the first shape.

As described hereinabove, in the in-vehicle display device to which the glass substrate unit 10 is assembled, the shape of the glass substrate 1 can be changed by moving the thin portion 2 following the switching of the mode related to the cluster position.

This enables enhancing the convenience of the in-vehicle display device and, more specifically, the position of the cluster can be adjusted to a position convenient for the driver according to the mode at that time.

The in-vehicle display device to which the glass substrate unit 10 is assembled is not limited to moving the thin portion 2 in the glass substrate 1, and the thick portion 3 may also be moved.

Figure 5:
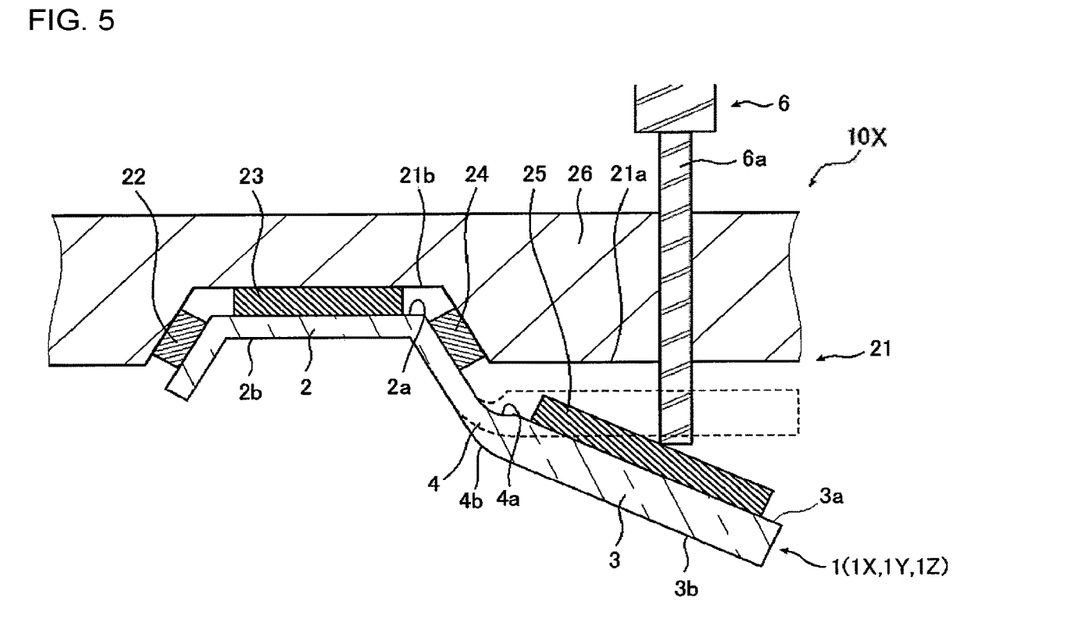
FIG. 5 is a schematic cross-sectional diagram illustrating a modification example of a glass substrate unit according to a first embodiment.

Specifically, for example, as illustrated in FIG. 5, the glass deformation device 6 may push the thick portion 3 to the front side at the time of handle operation and driving. In this case, the thick portion 3 together with CID moves (strictly, turns) to come close to the driving sheet with the connection portion 4 as the starting point, and the glass substrate 1 is bent forward or backward with the connection portion 4 as the starting point and thereby deformed.

FIG. 5 is a schematic cross-sectional diagram illustrating a glass substrate unit according to a modification example (hereinafter, a glass substrate unit 10X)

In an in-vehicle display device to which the glass substrate unit 10X is assembled, the thick portion 3 can be caused to come close together with CID to the driving sheet side during handle operation and driving, and the convenience for the driver is consequently enhanced.

Second Embodiment

Figure 6:
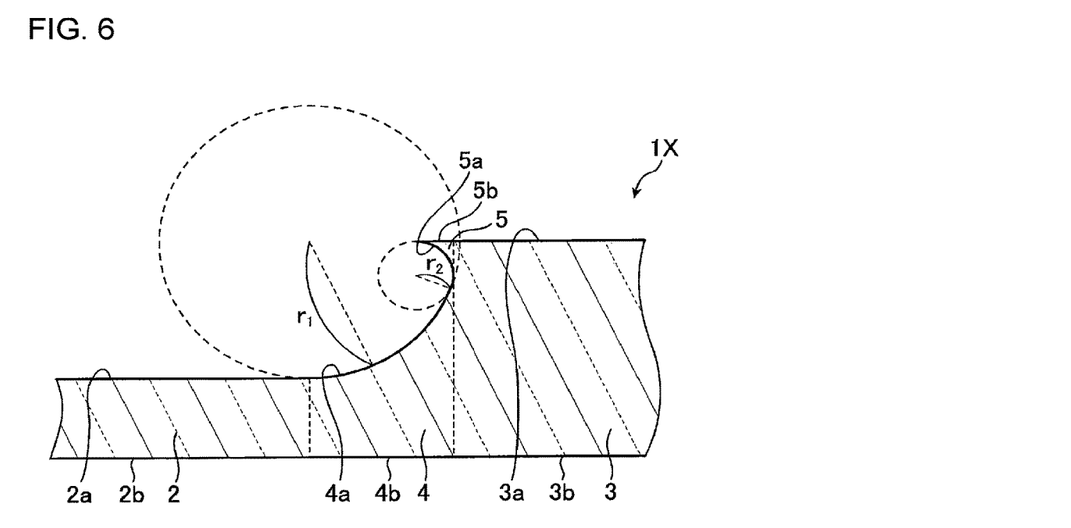
FIG. 6 is a schematic cross-sectional diagram illustrating a glass substrate according to a second embodiment.

A second embodiment is described by referring to FIG. 6.

FIG. 6 is a schematic cross-sectional diagram illustrating a glass substrate according to a second embodiment (hereinafter, glass substrate 1X).

Incidentally, the second embodiment differs from the first embodiment in the structure of the glass substrate but other points are common with the first embodiment. Therefore, in FIG. 6, the same portions as in the first embodiment are indicated by the same reference numerals, and descriptions thereof are omitted.

In the second embodiment, as illustrated in FIG. 6, the glass substrate 1X has an overhang part 5 in the connection portion 4.

The overhang part 5 is part of the connection portion 4 and is a region protruding toward the thin portion 2 from the thick portion 3. The overhang part 5 has an overhang surface 5a that is part of the first connection surface 4a of the connection portion 4 and a surface 5b that is flush with the first main surface 3a of the thick portion 3.

In the manufacturing method of a glass substrate according to the first embodiment, when dissolution of the glass sheet 41 by etching excessively proceeds at the time of slimming, the overhang part 5 is formed.

For the reason that when the glass substrate 1X is visually confirmed from the first main surface 2a and first main surface 3a side, the boundary portion between the thin portion 2 and the thick portion 3 is sharply recognized and this is preferred from the viewpoint of external appearance, the curvature radius $r_2$ of the overhang surface 5a illustrated in FIG. 6 is preferably 150 μm or more, more preferably 300 μm or more.

On the other hand, for the reason that the connection portion 4 is protected and thereby rendered resistant to breaking during transport or processing of the glass substrate 1X, the curvature radius $r_2$ of the overhang surface 5a is preferably 1,100 μm or less, more preferably 900 μm or less.

Here, the way of determining the curvature radius $r_2$ of the overhang surface 5a is described by referring to FIG. 11. The curvature radius $r_2$ of the overhang surface 5a is determined as follows.

First, consider a straight light $L_2$ orthogonally intersecting the straight line $L_1$.

The straight line $L_2$ is moved in a direction toward the overhang part 5 from the thick portion 3 and when the straight line $L_2$ first contacts at one point with the overhang surface 5a, the contact point is designated as point $S_4$.

Next, a point spaced from the point $S_4$ by a length $W_2$ (=10 μm) along the straight line $L_2$ toward the thick portion 3 side and located on the overhang surface 5a is designated as point $S_5$. A point spaced opposite to the point $S_5$ from the point $S_4$ along the straight line $L_2$ by a length $W_2$ (=10 μm) and located at a position axisymmetric with the point $S_5$ is designated as point $S_6$. The point $S_6$ may or may not be a point on the overhang surface 5a.

The radius of a true circle passing through point $S_4$, point $S_5$ and point $S_6$ is used as the curvature radius $r_2$ of the overhang surface 5a.

Third Embodiment

A third embodiment is described below by referring to FIG. 7 to FIG. 9.

Figure 7:
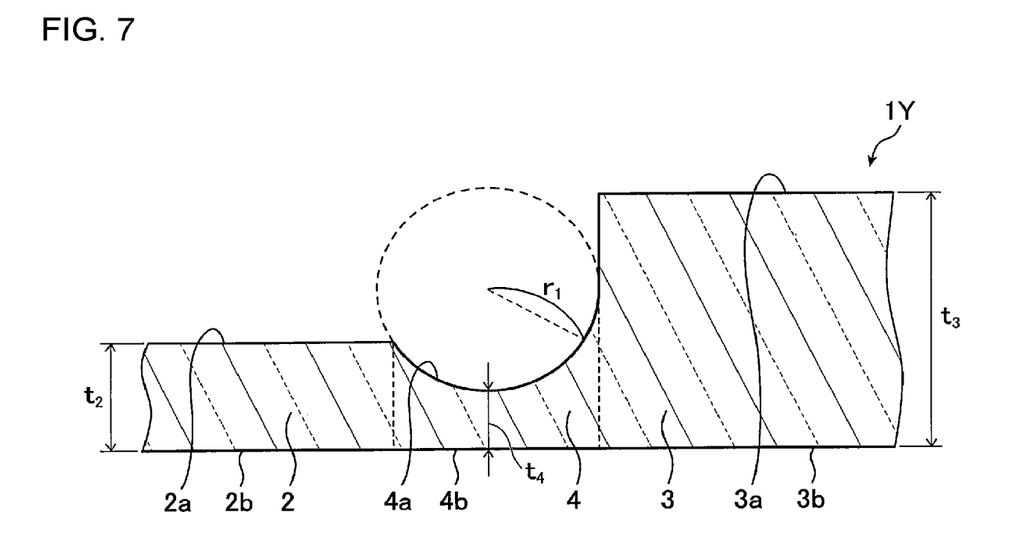
FIG. 7 is a schematic cross-sectional diagram illustrating a glass substrate according to a third embodiment.

FIG. 7 is a schematic cross-sectional diagram illustrating a glass substrate according to a third embodiment (hereinafter, glass substrate 1Y).

Figure 8:
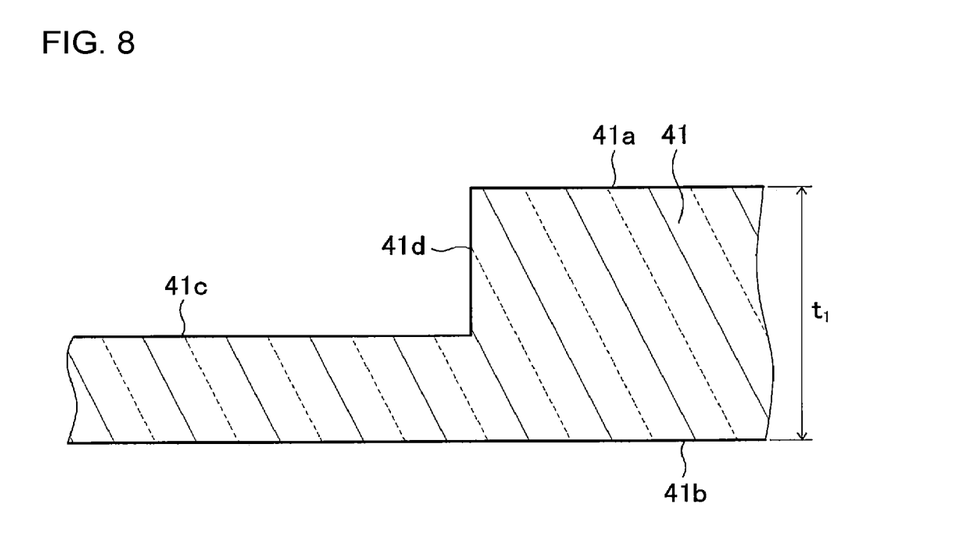
FIG. 8 is a schematic cross-sectional diagram illustrating a glass sheet after polishing.
Figure 9:
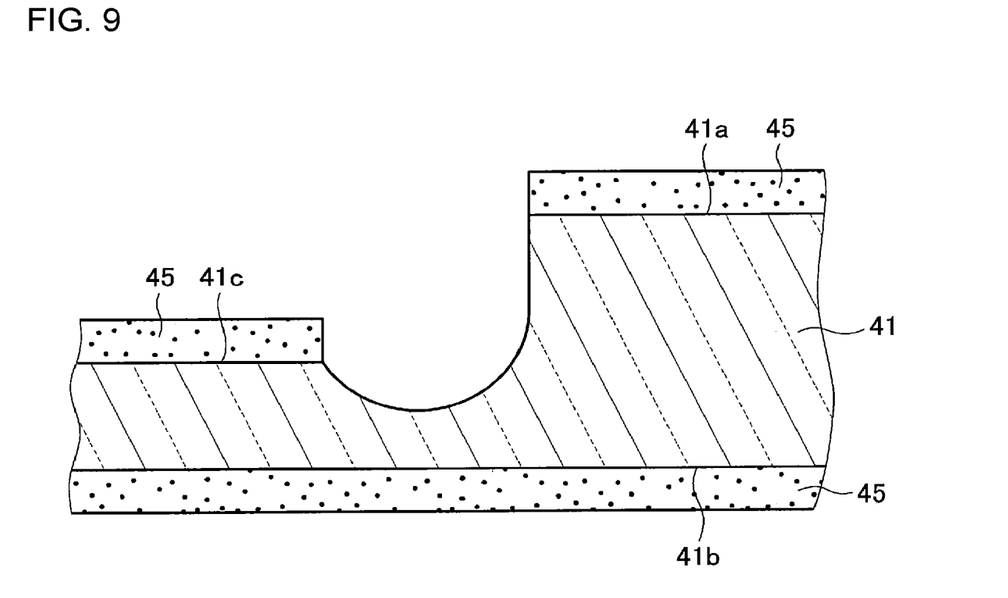
FIG. 9 is a schematic cross-sectional diagram illustrating a glass sheet after etching.

FIG. 8 and FIG. 9 are diagrams illustrating the manufacturing process of the glass substrate 1Y. FIG. 8 is a schematic cross-sectional diagram illustrating a glass sheet 41 after polishing. FIG. 9 is a schematic cross-sectional diagram illustrating a glass sheet 41 after etching.

Incidentally, the third embodiment differs from the first embodiment in the structure of the glass substrate but other points are common with the first embodiment. Therefore, in FIG. 7 to FIG. 9, the same portions as in the first embodiment are indicated by the same reference numerals, and descriptions thereof are omitted.

In the third embodiment, the sheet thickness of the thinnest portion in the connection portion 4 of the glass substrate 1Y is used as the sheet thickness $t_4$ of the connection portion 4.

In the glass substrate 1Y, the sheet thickness $t_4$ of the connection portion 4 is smaller than the sheet thickness $t_2$ of the thin portion 2. This makes it easier to bend the connection portion 4.

For the reason that this effect is exerted more effectively and, as described above, propagation of a crack over the connection portion 4 can be suppressed, the sheet thickness $t_4$ of the connection portion 4 is preferably 0.5 mm or less, more preferably 0.3 mm or less, still more preferably 0.2 mm or less.

On the other hand, the lower limit of the sheet thickness $t_4$ of the connection portion 4 is not particularly limited and is preferably 0.05 mm or more, more preferably 0.1 mm or more.

Next, the method for manufacturing the glass substrate 1Y is described by referring to FIG. 8 and FIG. 9.

Out of the manufacturing method of the glass substrate 1Y, since the steps except for slimming are the same as those of the first embodiment, descriptions thereof are omitted, and only slimming is described below.

The slimming in the manufacturing method of the glass substrate 1Y includes polishing, masking and etching.

In the polishing, as illustrated in FIG. 8, out of the glass sheet 41, portions serving as the thin portion 2 and connection portion 4 are polished from the first main surface 41a toward the second main surface 41b to reduce the sheet thickness $t_1$. The portion serving as the thick portion 3 is left without being polished.

As a result of the polishing, in the glass sheet 41, a polished surface 41c is formed at a position lower than the first main surface 41a.

At the boundary position between the first main surface 41a and the polished surface 41c, a polished end face 41d defining a step between both surfaces is formed.

The method for polishing is not particularly limited, and a conventionally known polishing pad, etc. is appropriately used.

In the masking after polishing, as illustrated in FIG. 9, the first main surface 41a, the entire surface of the second main surface 41b, and the polished surface 41c of the glass sheet 41 are covered by a mask material 45.

At this time, out of the polished surface 41c, only a surface serving as the first main surface 2a of the thin portion 2 is covered by a mask material 45. Also, the first main surface 41a may be covered by the mask material 45 while exposing a surface of an end portion of the polished end face 41d.

In the etching after masking, the glass sheet 41 covered by the mask material 45 is etched using an etchant. Consequently, dissolution by etchant gradually proceeds in the portions not covered by the mask material 45, specifically, part of the polished surface 41c, the polished end face 41d, and part of the first main surface 41a, toward the inside of the glass sheet 41.

Through etching, in the glass sheet 41, a portion serving as the connection portion 4 is formed between the portion covered by the mask material 45 out of the polished surface 41c and the first main surface 41a. Also, in the portion serving as the connection portion 4, a smooth etching surface (curved surface) is formed.

In the glass sheet 41, the portions maintained without being dissolved serve as the thin portion 2 and the thick portion 3.

After the etching, the mask material 45 is appropriately removed by a known method.

Fourth Embodiment

Figure 10:
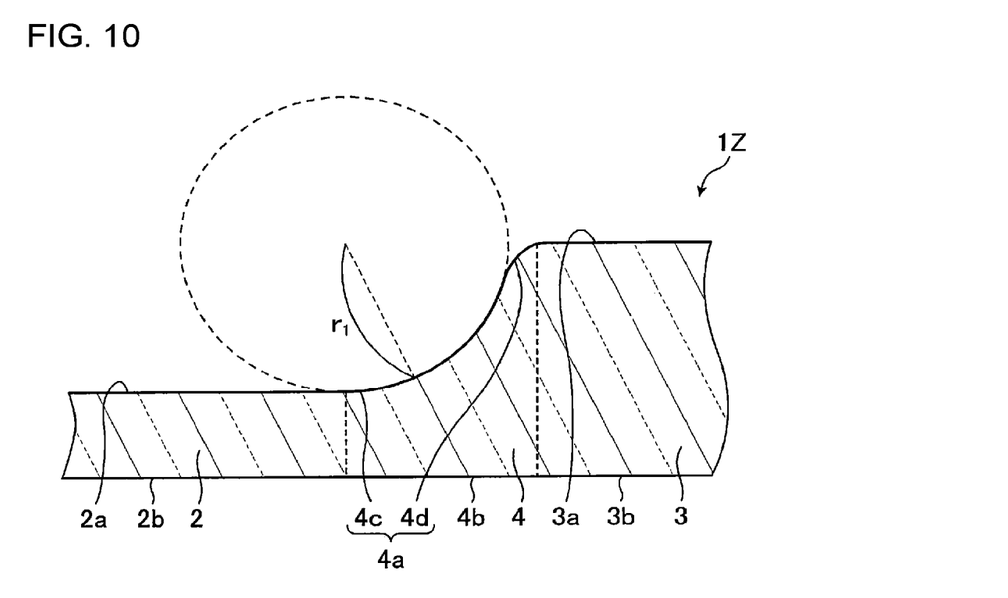
FIG. 10 is a schematic cross-sectional diagram illustrating a glass sheet according to a fourth embodiment.

Next, a fourth embodiment is described by referring to FIG. 10.

FIG. 10 is a schematic cross-sectional diagram illustrating a glass sheet according to a fourth embodiment (hereinafter, glass substrate 1Z).

Incidentally, the fourth embodiment differs from the first embodiment in the structure of the glass substrate but other points are common with the first embodiment. Therefore, in FIG. 10, the same portions as in the first embodiment are indicated by the same reference numerals, and descriptions thereof are omitted.

In the fourth embodiment, as illustrated in FIG. 10, the first connection surface 4a of the connection portion 4 in the glass substrate 1Z has a first adjoining surface 4c adjacent to the first main surface 2a of the thin potion 2 and a second adjoining surface 4d adjacent to the first main surface 3a of the thick portion 3.

The first adjoining surface 4c is an arc-shaped curved surface convex toward the second connection surface 4b of the connection surface 4.

The second adjoining surface 4d is an arc-shaped curved surface convex toward an opposite side to the second connection surface 4b.

As illustrated in FIG. 10, the first adjoining surface 4c and the second adjoining surface 4d are connected to each other to constitute the first connection surface 4a that is bent into an S shape.

Out of the first main surface 41a covered by the mask material 45 at the time of etching in the manufacturing method of the glass substrate according to the third embodiment, an end portion on the side closer to the polished surface 41c is polished after etching and cut in arc, as a result, the first connection surface 4a bent into an S shape is formed.

In the glass substrate 1Z, the first connection surface 4a of the connection portion 4 is gently bent into an S shape and therefore, when a film material such as OCA is closely adhered to the first connection surface 4a, on the occasion of entering of bubbles between the first connection surface 4a and the film material, escape of the bubbles is more facilitated.

Incidentally, in the fourth embodiment, the curvature radius of the first adjoining surface 4c corresponds to the curvature radius $r_1$ of the first connection surface 4a of the connection portion 4.

While the invention has been described in detail and with reference to specific embodiments thereof, it will be apparent to one skilled in the art that various changes and modifications can be made therein without departing from the spirit and scope of the invention.

This application is based on Japanese Patent Application No. 2019-160236 filed on Sep. 3, 2019, the contents of which are incorporated herein by way of reference.

REFERENCE SIGNS LIST

1: Glass substrate
1X: Glass substrate
1Y: Glass substrate
1Z: Glass substrate
2: Thin portion
2a: First main surface
2b: Second main surface
3: Thick portion
3a: First main surface
3b: Second main surface
4: Connection portion
4a: First connection surface
4b: Second connection surface
4c: First adjoining surface
4d: Second adjoining surface
5: Overhang part
5a: Overhang surface
5b: Surface
6: Glass deformation device
6a: Rod
7: Controller
8: Sensor
10: Glass substrate unit (cover glass assembly)
10X: Glass substrate unit
21: Uneven structure
21a: Convex portion
21b: Concave portion
22: Display panel
23: Display panel
24: Display panel
25: Display panel
26: Flame
41: Glass sheet
41a: First main surface
41b: Second main surface
41c: Polished surface
41d: Polished end face
45 Mask material
$r_1$: Curvature radius of first connection surface
$r_2$: Curvature radius of overhang surface
$t_1$: Sheet thickness of glass sheet
$t_2$: Sheet thickness of thin portion
$t_3$: Sheet thickness of thick portion
$t_4$: Sheet thickness of connection portion
$L_1, L_2$: Straight line
$W_1, W_2$: Length
$\theta_1$: Angle
$S_1, S_2, S_3, S_4, S_5, S_6$: Point
$P_1$: Position
$D_1, D_2$: Distance

The invention claimed is:

1. A glass substrate unit, comprising:
a glass substrate; and
a glass deformation device that deforms the glass substrate,
wherein the glass substrate comprises a thin portion, a thick portion having a sheet thickness larger than a sheet thickness of the thin portion, and a connection portion connecting the thin portion and the thick portion such that the thin portion and the connection portion are configured to be elastically deformed, the thin portion has a first main surface and a second main surface on an opposite side with respect to the first main surface, the thick portion has a first main surface and a second main surface on an opposite side with respect to the first main surface of the thick portion, the connection portion has a first connection surface and a second connection surface such that the first connection surface is connecting the first main surface of the thin portion and the first main surface of the thick portion and the second connection surface is connecting the second main surface of the thin portion and the second main surface of the thick portion and is forming a same plane with respect to the second main surface of the thin portion and the second main surface of the thick portion when the glass substrate is not elastically deformed, the glass deformation device deforms the glass substrate by moving one of the thin portion and the thick portion, and the first connection surface has an arc-shaped curved surface having a curvature radius of 400 μm or more.

2. The glass substrate unit according to claim 1, wherein the glass substrate is configured to switch between a first shape where the thin portion extends in a plate shape and a second shape where the thin portion is elastically deformed.

3. The glass substrate unit according to claim 2, wherein the thin portion of the glass substrate is configured to be elastically deformed into a concave shape in the second shape.

4. The glass substrate unit according to claim 2, wherein the connection portion of the glass substrate has an arc-shaped curved surface and a linear surface on an opposite side with respect to the arc-shaped curved surface in the first shape.

5. The glass substrate unit according to claim 1, further comprising:
a display panel mounted on the first main surface of the thin portion of the glass substrate,
wherein the glass deformation device moves the thin portion of the glass substrate together with the display panel.

6. The glass substrate unit according to claim 5, wherein the glass deformation device comprises an actuator configured to apply an external force to one of the thin portion and the thick portion in the glass substrate.

7. The glass substrate unit according to claim 1, wherein the glass substrate is configured to be deformed from a starting point of deformation formed in the connection portion or on a thin portion side relative to the connection portion.

8. The glass substrate unit according to claim 7, wherein the glass substrate is configured to switch between a first shape where the thin portion extends in a plate shape and a second shape where the thin portion is elastically deformed.

9. The glass substrate unit according to claim 7, wherein the connection portion of the glass substrate has an overhang part.

10. The glass substrate unit according to claim 1, wherein the glass substrate is configured to be deformed from a starting point of deformation formed in the connection portion or on a thin portion side relative to the connection portion, and a sheet thickness of the thinnest part in the connection portion is smaller than the sheet thickness of the thin portion.

11. The glass substrate unit according to claim 10, wherein the sheet thickness of the thinnest part in the connection portion is 0.5 mm or less.

12. The glass substrate unit according to claim 1, wherein the glass substrate is configured to be deformed from a starting point of deformation formed in the connection portion or on a thin portion side relative to the connection portion, wherein the first connection surface has a first adjoining surface adjacent to the first main surface of the thin potion and a second adjoining surface adjacent to the first main surface of the thick portion, and wherein the first adjoining surface and the second adjoining surface both are an arc-shaped curved surface and are connected to each other to constitute the first connection surface that is bent into an S shape.

13. The glass substrate unit according to claim 1, wherein the glass substrate is formed such that the sheet thickness of the thin portion is in a range of 0.05 mm to 0.8 mm, and the sheet thickness of the thick portion is in a range of 0.5 mm to 2.5 mm.

14. The glass substrate unit according to claim 1, wherein the glass substrate is a chemically strengthened glass.

15. The glass substrate unit according to claim 1, wherein the glass deformation device comprises an actuator configured to apply an external force to one of the thin portion and the thick portion in the glass substrate.

16. The glass substrate unit according to claim 15, further comprising;
a controller comprising circuitry configured to control an operating state of the actuator.

17. The glass substrate unit according to claim 1, further comprising:
a plurality of display panels comprising at least one display panel mounted on a surface of the thick portion of the glass substrate and a plurality of display panels mounted on a surface of the thin portion of the glass substrate,
wherein the glass deformation device moves the thin portion of the glass substrate together with the display panels mounted on the surface of the thin portion of the glass substrate.

18. A cover glass assembly, comprising:
the glass substrate unit of claim 1,
wherein the glass substrate of the glass substrate unit is configured to function as a cover glass of a display panel.

19. An in-vehicle display device, comprising:
the glass substrate unit of claim 1;
an instrument cluster mounted on a surface of the thin portion of the glass substrate and positioned in front of a driving seat; and
a center information display mounted on a surface of the thick portion of the glass substrate and positioned in front of an area between the driving seat and a passenger seat,
wherein the glass deformation device elastically deforms the thin portion into a concave shape and moves the thin portion together with the instrument cluster.

20. An in-vehicle display device, comprising:
the glass substrate unit of claim 1;
an instrument cluster mounted on a surface of the thin portion of the glass substrate and positioned in front of a driving seat; and
a center information display mounted on a surface of the thick portion of the glass substrate and positioned in front of an area between the driving seat and a passenger seat,
wherein the glass deformation device moves the thick portion close to the driving seat together with the center information display while a vehicle equipped with the in-vehicle display device is driving.

21. A glass substrate unit, comprising:
a glass substrate;
a plurality of display panels; and
a glass deformation device that deforms the glass substrate,
wherein the glass substrate comprises a thin portion, a thick portion having a sheet thickness larger than a sheet thickness of the thin portion, and a connection portion connecting the thin portion and the thick portion such that the thin portion and the connection portion are configured to be elastically deformed, the thin portion has a first main surface and a second main surface on an opposite side with respect to the first main surface, the thick portion has a first main surface and a second main surface on an opposite side with respect to the first main surface of the thick portion, the connection portion has a first connection surface and a second connection surface such that the first connection surface is connecting the first main surface of the thin portion and the first main surface of the thick portion and the second connection surface is connecting the second main surface of the thin portion and the second main surface of the thick portion and is forming a same plane with respect to the second main surface of the thin portion and the second main surface of the thick portion when the glass substrate is not elastically deformed, the glass deformation device deforms the glass substrate by moving one of the thin portion and the thick portion, and the plurality of display panels comprise a first display panel mounted on a surface of the thick portion of the glass substrate and a second display panel mounted on a surface of the thin portion of the glass substrate.

22. The glass substrate unit according to claim 21, wherein the glass substrate is configured to switch between a first shape where the thin portion extends in a plate shape and a second shape where the thin portion is elastically deformed.

23. The glass substrate unit according to claim 22, wherein the thin portion of the glass substrate is configured to be elastically deformed into a concave shape in the second shape.

24. The glass substrate unit according to claim 22, wherein the connection portion of the glass substrate has an arc-shaped curved surface and a linear surface on an opposite side with respect to the arc-shaped curved surface in the first shape.

25. The glass substrate unit according to claim 21, further comprising:
a display panel mounted on the first main surface of the thin portion of the glass substrate,
wherein the glass deformation device moves the thin portion of the glass substrate together with the display panel.

26. The glass substrate unit according to claim 25, wherein the glass deformation device comprises an actuator configured to apply an external force to one of the thin portion and the thick portion in the glass substrate.

27. The glass substrate unit according to claim 21, wherein the glass substrate is configured to be deformed from a starting point of deformation formed in the connection portion or on a thin portion side relative to the connection portion, and the connection portion of the glass substrate has an arc-shaped curved surface having a curvature radius of 400 μm or more.

28. The glass substrate unit according to claim 27, wherein the glass substrate is configured to switch between a first shape where the thin portion extends in a plate shape and a second shape where the thin portion is elastically deformed.

29. The glass substrate unit according to claim 27, wherein the connection portion of the glass substrate has an overhang part.

30. The glass substrate unit according to claim 21, wherein the glass substrate is configured to be deformed from a starting point of deformation formed in the connection portion or on a thin portion side relative to the connection portion, and a sheet thickness of the thinnest part in the connection portion is smaller than the sheet thickness of the thin portion.

31. The glass substrate unit according to claim 30, wherein the sheet thickness of the thinnest part in the connection portion is 0.5 mm or less.

32. The glass substrate unit according to claim 21, wherein the glass deformation device moves the thin portion of the glass substrate together with the second display panel mounted on the surface of the thin portion of the glass substrate.

33. The glass substrate unit according to claim 21, wherein the glass substrate is configured to be deformed from a starting point of deformation formed in the connection portion or on a thin portion side relative to the connection portion, wherein the first connection surface has a first adjoining surface adjacent to the first main surface of the thin potion and a second adjoining surface adjacent to the first main surface of the thick portion, and wherein the first adjoining surface and the second adjoining surface both are an arc-shaped curved surface and are connected to each other to constitute the first connection surface that is bent into an S shape.

34. The glass substrate unit according to claim 21, wherein the glass substrate is formed such that the sheet thickness of the thin portion is in a range of 0.05 mm to 0.8 mm, and the sheet thickness of the thick portion is in a range of 0.5 mm to 2.5 mm.

35. The glass substrate unit according to claim 21, wherein the glass substrate is a chemically strengthened glass.

36. The glass substrate unit according to claim 21, wherein the glass deformation device comprises an actuator configured to apply an external force to one of the thin portion and the thick portion in the glass substrate.

37. The glass substrate unit according to claim 36, further comprising;
 a controller comprising circuitry configured to control an operating state of the actuator.

38. A cover glass assembly, comprising:
 the glass substrate unit of claim 21,
 wherein the glass substrate of the glass substrate unit is configured to function as a cover glass of a display panel.

39. An in-vehicle display device, comprising:
 the glass substrate unit of claim 21;
 an instrument cluster mounted on a surface of the thin portion of the glass substrate and positioned in front of a driving seat; and
 a center information display mounted on a surface of the thick portion of the glass substrate and positioned in front of an area between the driving seat and a passenger seat,
 wherein the glass deformation device elastically deforms the thin portion into a concave shape and moves the thin portion together with the instrument cluster.

40. An in-vehicle display device, comprising:
 the glass substrate unit of claim 21;
 an instrument cluster mounted on a surface of the thin portion of the glass substrate and positioned in front of a driving seat; and
 a center information display mounted on a surface of the thick portion of the glass substrate and positioned in front of an area between the driving seat and a passenger seat,
 wherein the glass deformation device moves the thick portion close to the driving seat together with the center information display while a vehicle equipped with the in-vehicle display device is driving.

* * * * *